US012749328B2

(12) United States Patent
Wei

(10) Patent No.: US 12,749,328 B2
(45) Date of Patent: Sep. 29, 2026

(54) METHOD AND APPARATUS FOR FORM IDENTIFICATION AND REGISTRATION EMPLOYING PREDEFINED TEXT GROUPING

(71) Applicant: KONICA MINOLTA BUSINESS SOLUTIONS U.S.A., INC., Foster City, CA (US)

(72) Inventor: Junchao Wei, San Mateo, CA (US)

(73) Assignee: KONICA MINOLTA BUSINESS SOLUTIONS U.S.A., INC., Foster City, CA (US)

( * ) Notice: Subject to any disclaimer, the term of this patent is extended or adjusted under 35 U.S.C. 154(b) by 564 days.

(21) Appl. No.: 18/128,951

(22) Filed: Mar. 30, 2023

(65) Prior Publication Data

US 2024/0331430 A1 Oct. 3, 2024

(51) Int. Cl.

*G06V 30/412* (2022.01)
*G06T 7/30* (2017.01)
(Continued)

(52) U.S. Cl.

CPC .............. *G06V 30/412* (2022.01); *G06T 7/30* (2017.01); *G06V 10/70* (2022.01); *G06V 30/413* (2022.01); *G06T 2207/30176* (2013.01)

(58) Field of Classification Search

CPC .... G06V 30/412; G06V 10/70; G06V 30/413; G06V 10/82; G06V 30/19173; G06T 7/30; G06T 2207/30176

See application file for complete search history.

(56) References Cited

U.S. PATENT DOCUMENTS

| | | | | |
|---|---|---|---|---|
| 2003/0167267 A1* | 9/2003 | Kawatani | ................ | G06F 18/22 |
| 2015/0317293 A1* | 11/2015 | Greisson | ................ | H04L 51/04<br>715/256 |

(Continued)

FOREIGN PATENT DOCUMENTS

| | | |
|---|---|---|
| JP | H06-209398 A | 7/1994 |
| JP | 2006-127451 A | 5/2006 |

(Continued)

OTHER PUBLICATIONS

Notice of Reasons for Refusal dated Aug. 5, 2025 issued in corresponding Japanese Patent Application No. 2024-038059, with English language translation thereof.

(Continued)

*Primary Examiner* — Emily C Terrell
*Assistant Examiner* — Dominique James
(74) *Attorney, Agent, or Firm* — SQUIRE PATTON BOGGS (US) LLP

(57) ABSTRACT

Aspects of the present invention provide a computer-implemented method of training a machine learning system to identify forms. In embodiment, the method may include: receiving a form as an input image; identifying one or more fields in the input image; for each identified field, identifying one or more sub-regions in the identified field; responsive to identification of the one or more fields, categorizing the one or more fields; identification of relative locations of the one or more fields in the input image; and, responsive to the identification of the relative locations, categorizing the form. Other aspects of the present invention provide a computer-implemented method of using a machine learning system to identify forms, using the just-enumerated method.

16 Claims, 11 Drawing Sheets

100

(51) Int. Cl.
*G06V 10/70* (2022.01)
*G06V 30/413* (2022.01)

(56) References Cited

U.S. PATENT DOCUMENTS

| | | | | |
|---|---|---|---|---|
| 2021/0326631 | A1* | 10/2021 | Chaudhary | G06V 30/413 |
| 2022/0035993 | A1* | 2/2022 | Bhandarkar | G06V 30/414 |
| 2022/0067320 | A1* | 3/2022 | Zakharov | G06F 16/953 |
| 2023/0153335 | A1* | 5/2023 | McNeill | G06F 16/316<br>707/741 |
| 2023/0290164 | A1* | 9/2023 | Povish | G06K 19/06037 |

FOREIGN PATENT DOCUMENTS

| | | | | |
|---|---|---|---|---|
| JP | 2009110500 | A * | 5/2009 | |
| JP | 2021-125040 | A | 8/2021 | |
| JP | 2021-152924 | A | 9/2021 | |
| JP | 2022-162379 | A | 10/2022 | |
| WO | WO-2022134954 | A1 * | 6/2022 | G06F 3/0481 |

OTHER PUBLICATIONS

Decision of Refusal dated Mar. 3, 2026 issued in corresponding Japanese Patent Application No. 2024-038059, with English language machine translation thereof.

* cited by examiner

110

INVOICE
XYZ Corporation
1234 Main Street
New London, California
99123

XYZ Corporation 122 120

| Widget Order | | | | | |
|---|---|---|---|---|---|
| Widget | Color | Size | Quantity | Price | Total |
| XY-1447 | Blue | S | 4 | 250 | 1000 |
| XY-1447 | Black | S | 4 | 200 | 800 |
| XZ-4545 | Black | L | 4 | 300 | 1200 |
| XP-7879 | Black | L | 4 | 500 | 2000 |
| XD-9853 | Blue | M | 6 | 150 | 900 |
| XG-5847 | Yellow | XS | 6 | 100 | 600 |
| XG-5847 | Yellow | M | 2 | 150 | 300 |
| XF-1358 | Blue | S | 8 | 125 | 1000 |
| XB-3434 | Blue | XXL | 8 | 400 | 3200 |
| | | | | | |
| Subtotal | | | | | 11000 |
| Sales Tax | | | | | 1045 |
| Shipping | | | | | 500 |
| Total | | | | | 12545 |

126 122 124 126

FIG. 2

METHOD AND APPARATUS FOR FORM IDENTIFICATION AND REGISTRATION EMPLOYING PREDEFINED TEXT GROUPING

CROSS-REFERENCE TO RELATED APPLICATION

The present application is related to U.S. application Ser. No. 17/958,262, filed Sep. 30, 2022, entitled "Method and Apparatus for Form Identification and Registration", now U.S. Pat. No. 12,340,607, issued Jun. 24, 2025. The present application incorporates by reference this US application in its entirety.

FIELD OF THE INVENTION

Aspects of the present invention relate to image processing, and more particularly, to forms processing.

BACKGROUND OF THE INVENTION

In the field of document and form analysis, form matching and registration, including content location, are important, but can be challenging. Among the challenges are: 1) forms that are relatively unstructured (semi-structured); 2) scanning extraction errors (whether optical character recognition (OCR) or image character recognition (ICR) or some combination of the two (OICR)); 3) tables that may appear in different parts of a form, and/or that may have variable sizes; and 4) scaling to large datasets and variants while retaining robustness.

Semi-structured form representation mixes topological features (such as bounding boxes and semantic information). This mixing makes it challenging to understand possible associations among topological features when scanning or photographing result in rotation, translation, and/or scaling of a form.

It would be desirable to provide an efficient, scalable, and generalizable approach to address the above-mentioned issues.

SUMMARY OF THE INVENTION

In view of the foregoing, aspects of the present invention train a machine learning system to identify a plurality of generic groups or regions on forms, and use topographical and semantic relationships among these groups or regions to identify corresponding such groups or regions on the same or different forms.

BRIEF DESCRIPTION OF THE DRAWINGS

Aspects of the invention now will be described with reference to embodiments as illustrated in the accompanying drawings, in which:

FIG. 2 shows a mock-up of a different form with a plurality of fields;

DETAILED DESCRIPTION OF EMBODIMENTS

Figure 1:
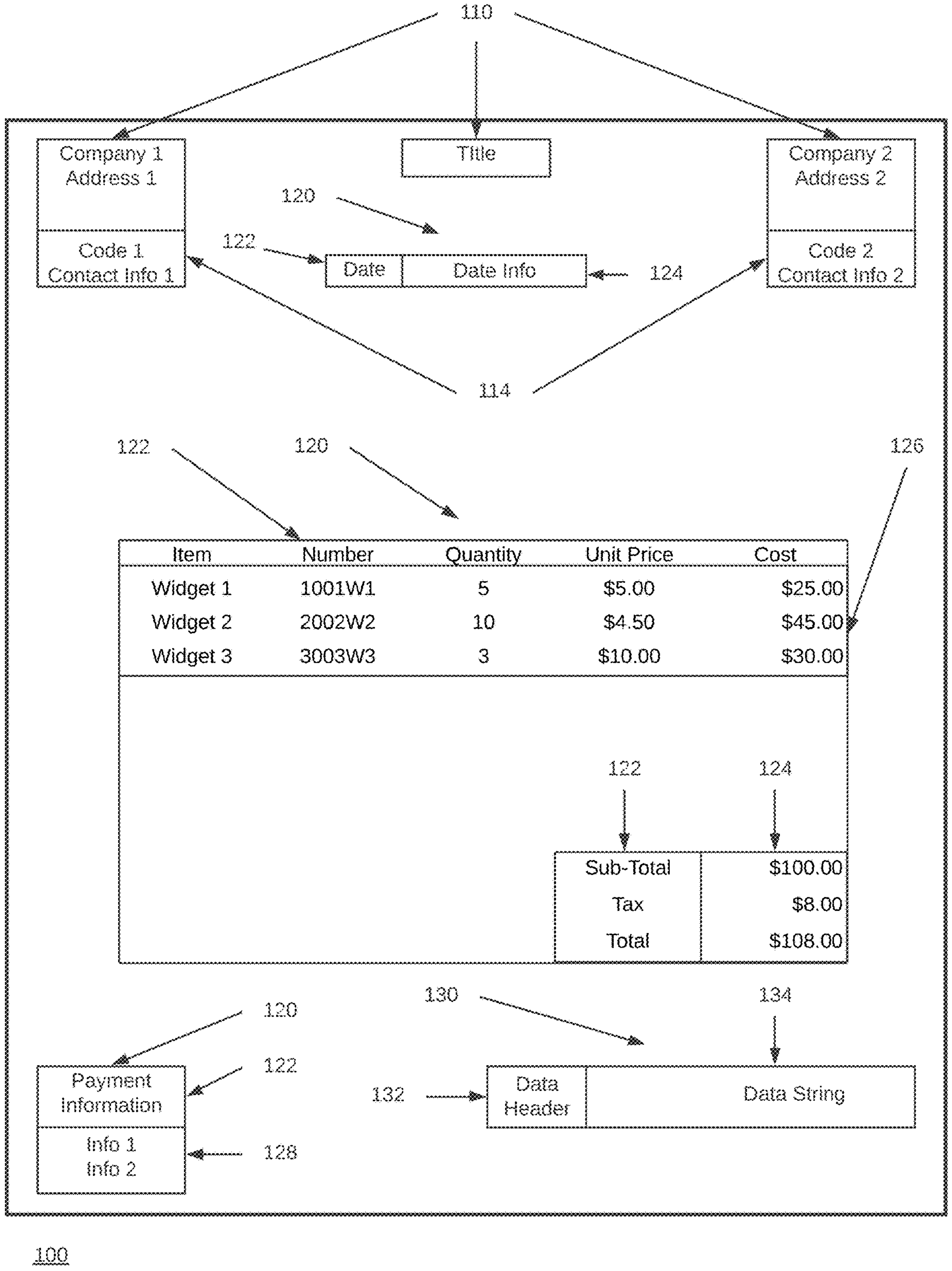
FIG. 1 shows a mock-up of a form with a plurality of fields.

In embodiments, a plurality of generic text groups or regions in a form are identified. In the non-limiting embodiments discussed below, six such regions are described.

Aspects of the present invention provide a computer-implemented method of training a machine learning system to identify forms, the method comprising: receiving a form as an input image; identifying one or more fields in the input image; for each identified field, identifying one or more sub-regions in the identified field; responsive to identification of the one or more fields, categorizing the one or more fields; identification of relative locations of the one or more fields in the input image; and, responsive to the identification of the relative locations, categorizing the form.

In an embodiment, the actions in the preceding paragraph may be repeated until there are no more input images to be received. In an embodiment, the input images may be scanned images, or may be synthetically-generated forms. In an embodiment, responsive to an incorrect categorization of the form, the machine learning system may be updated. In an embodiment, updating the machine learning system may comprise updating weights in the machine learning system. In an embodiment, the incorrect categorization may be corrected.

In an embodiment, the computer-implemented method may comprise identifying boundaries of the one or more sub-regions; classifying the one or more sub-regions in accordance with its position in the field; and repeating the identifying, and classifying until all sub-regions in the field are identified.

In an embodiment, the computer-implemented method may comprise identifying the one or more fields responsive to the identification of the one or more sub-regions, including the positions of the one or more sub-regions relative to each other in the identified field.

In an embodiment, categorizing the one or more fields comprises discerning a format of the one or more fields. In an embodiment, for each of the one or more fields, discerning the format of the one or more fields may comprise discerning a format of the one or more sub-regions. In an embodiment, the computer implemented method may further comprise distinguishing some of the one or more fields from others of the one or more fields by identifying different format and/or location.

Other aspects of the present invention provide a computer-implemented method of using a machine learning system to identify forms, the method comprising: receiving a form as an input image; identifying one or more fields in the input image; for each identified field, identifying one or more sub-regions in the identified field; responsive to identification of the one or more fields, categorizing the one or more fields; identification of relative locations of the one or more fields in the input image; and, responsive to the identification of the relative locations, categorizing the form.

Still other aspects of the invention provide a machine learning system to identify forms, the machine learning system comprising at least one processor and a non-transitory memory that is programmed for the machine learning system to perform a method according to the method just summarized.

The just-discussed aspects of the invention according to embodiments may be appreciated better with reference to the examples below.

FIG. 1 shows a mockup of a form 100 with three types of regions 110, 120, and 130 which are different types of groupings of data in a form. Such a mockup may be used in training the machine learning system in accordance with an embodiment. In an embodiment, regions 110 may contain information common to a particular type of form. For an invoice, such information may include the title of the form, names and addresses of companies (for example, the billing company and the billed company). This content information may be termed semantic information. In addition, these regions 110 often occur in the same approximate location across many different types of forms. This location information may be termed topological information. Accordingly, when a machine learning system analyzes different types of forms, it is possible to train the machine learning system to recognize such regions when analyzing different types of forms. For example, relative locations of the regions 110 with respect to each other (topological information) may provide information about the content of those regions (semantic information). In an embodiment, the machine learning system may be trained to recognize patterns of positions of regions. The system may classify these patterns so that the system may recognize a particular form, or type of form, in the future. In an embodiment, the pattern classification may enable placement of forms in certain categories, for example, invoices, so that the system may recognize the invoices in the future.

Viewed another way, regions 110, 120, and 130 contain a number of characters in various known locations. The character locations within these regions can have significance in identifying what the field is (for example, an address field), or in reproducing the form, or in matching the form with other forms, or in performing form registration, in which translation, scaling, and/or rotation of an input form may be necessary in order to align the fields correctly with fields in corresponding forms.

In an embodiment, areas 114 within regions 110 may be simply part of the overall region 110, and undifferentiated from other data in the region. That is, the data in areas 114 may simply be part of the overall semantic information in region 110. In an embodiment, the areas 114 may be differentiated from other data in the region, for example, as a table, such as a one-dimensional horizontal table, or a two-dimensional vertical table. In an embodiment, the topological information will be the same, but the type of semantic information will be different. In an embodiment, the machine learning system may be trained to recognize both the undifferentiated and differentiated situations, in light of the topological information which will be common to both situations.

In an embodiment, regions 120 can often contain tabular information of various types. For example, for an invoice there may be tables for purchased items, including quantities and unit prices. There may be a table for subtotal, tax, and total. There may be other tables, as ordinarily skilled artisans will appreciate. Vertical tables can have headers (containing what may be considered keywords) and rows of data appropriately under each of the words in the headers. Horizontal tables can have the header on the left hand side and the data corresponding to that header on the right hand side. There may be horizontal tables with multiple rows, in which the header proceeds vertically down the form rather than horizontally across the form. In an embodiment, detected vertical and horizontal tables which are adjacent to each other may be grouped into a region 120.

In FIG. 1, headers 122 may be found in a vertical table, such as the larger table toward the middle of form 100, with headers "item," "number," "quantity," "unit price," and "cost," followed by rows of data 126 below the headers. A header also may be present in a table in a single row, such as the header with the words "payment information" at the lower left-hand corner of the form 100. Data 128 appears in rows beneath the header in that lower left-hand table.

Headers 122 also may be found in a horizontal table, such as the date table in an upper central portion of form 100. In these horizontal tables, a header 122 on the left hand side is followed by data on the right hand side. The date table has the header "date" on the left hand side, and the date information on the right hand side. There also may be a horizontal table such as the totaling table toward the lower right hand side of form 100 below the vertical table. In the totaling table, the header is in a single row, with the words "sub-total," "tax," and "total". In an embodiment, there may be a row for shipping charges. The data for each of those header words is to the right of its associated header word. In an embodiment, the date table may be a vertical table rather than a horizontal table.

A machine learning system may be trained to recognize either horizontal or vertical tables in expected topological locations on forms 100. It should be noted that the recognition of a table per se does not require recognition of actual contents, i.e., does not require precise deciphering of header text and associated data. Rather, recognition of text (vertically or horizontally) as a header, and numbers (either horizontally or vertically) as data is sufficient. In an embodiment, the machine learning system may be trained to recognize a table as being vertical or horizontal depending on the locations of the headers in the table. In addition, when it comes to identifying an invoice table that shows items being ordered or purchased, the machine learning system may recognize that such a table normally belongs in a central portion of a page of a form. If the table goes on to multiple pages, there may be information such as header 110 at the top of each page. The machine learning system may be trained to recognize that, and also to recognize that an itemized invoice table may be split among multiple pages. In such instances, topological location of headers and of the itemized invoice table may be instructive to the machine learning system in terms of recognizing invoice tables in other types of forms. Tables within tables, such as the horizontal "total" table underneath the vertical "itemized invoice) table also can be instructive to the machine learning system.

Also in an embodiment, in FIG. 1, there is a region 120 at the lower left hand side of form 100. Header 122 may contain keywords such as, for example, "bank information," as in FIG. 1. Data 128, which may be beneath or to the side of header 122, may comprise information corresponding to header 122.

It should be noted that areas like 124 do not necessarily have areas 122 associated with them. In an embodiment, the same may be true for areas like 126. In one aspect, detection of table data, whether horizontal or vertical, may be possible even if the keywords are not present.

In an embodiment, sub-region combinations can be used to detect vertical or horizontal table regions. In one aspect, a horizontal table may have a left hand side like area 122 (a keyword or keywords), and a right hand side like area 124 (data corresponding to the keyword). A vertical table may have a first row like area 122 (again, a keyword or keywords), and subsequent rows like area 126 (data corresponding to each respective keyword).

There may be yet another kind of semantic information, such as data string 134 in region 130 in the lower right hand portion of form 100 in FIG. 1. Forms may have textual information which can vary widely, but which is not necessarily in tabular form, or in any way recognizable as keywords. In a particular form type, it is possible that the textual information can be standard, for example, as in standard contract terms, or a standard disclaimer. It also is possible that textual information may vary within the same form type, for example, as in a Comments field or Special Instructions field. In an embodiment, region 130 may contain a data header 132 preceding data string 134. In an embodiment, data header 132 may not be present. The machine learning system can be trained to recognize region 130 as a textual region, based for example on the region's location (topographical information) and its textual content (semantic information). Here again, the precise content of the textual information in region 130 need not be determined. Rather it is the general nature of the information that may be instructive to the machine learning system.

From the foregoing, ordinarily skilled artisans will appreciate that, in embodiments of the invention, explicit deciphering of keywords is not necessary in order to train the machine learning system to recognize forms. Rather, the recognition of types of fields in requisite proximity to each other, and/or in particular locations in a form, without having to recognize specific data will be sufficient (for example, in the case of a blurry input image, in which data may not be distinct, but formatting may be discernible). In such an event, text detection errors and/or recognition errors may be possible. Such errors need not be fatal to the machine learning system's ability to identify topographical and semantic information of regions correctly. In addition, in an embodiment, as noted earlier, mockups of forms may be employed as training data. In an embodiment, such forms may contain simulations of blurry or otherwise difficult to read data.

As ordinarily skilled artisans will appreciate from the discussion below, training the machine learning system can involve altering weights of various nodes in various layers in the system.

In FIG. 2, which is a mockup of a different kind of invoice, region 110 in the upper left hand side of the form contains the form title and company information. As is the case with FIG. 1, such a mockup may be used in training the machine learning system in accordance with an embodiment. Region 110 in the upper right hand side of the form contains the company logo. A machine learning system may be trained to recognize logos in forms by their locations (topographical information) and by their general content (semantic information) without having to decipher the specific logo.

FIG. 2 shows a region 120 more prominently located in the form, and taking a proportionately larger space. There are two rows of headers 122 for the vertical part of the table, above rows 126 of data for the vertical table, and four rows of headers 122 for the horizontal part of the table, to the left of data 124 for the horizontal table. In comparison with a similar horizontal table in FIG. 1 (with subtotal, tax, and total), the horizontal table at the bottom of region 120 in FIG. 2. extends across the width of the region.

Figure 3:
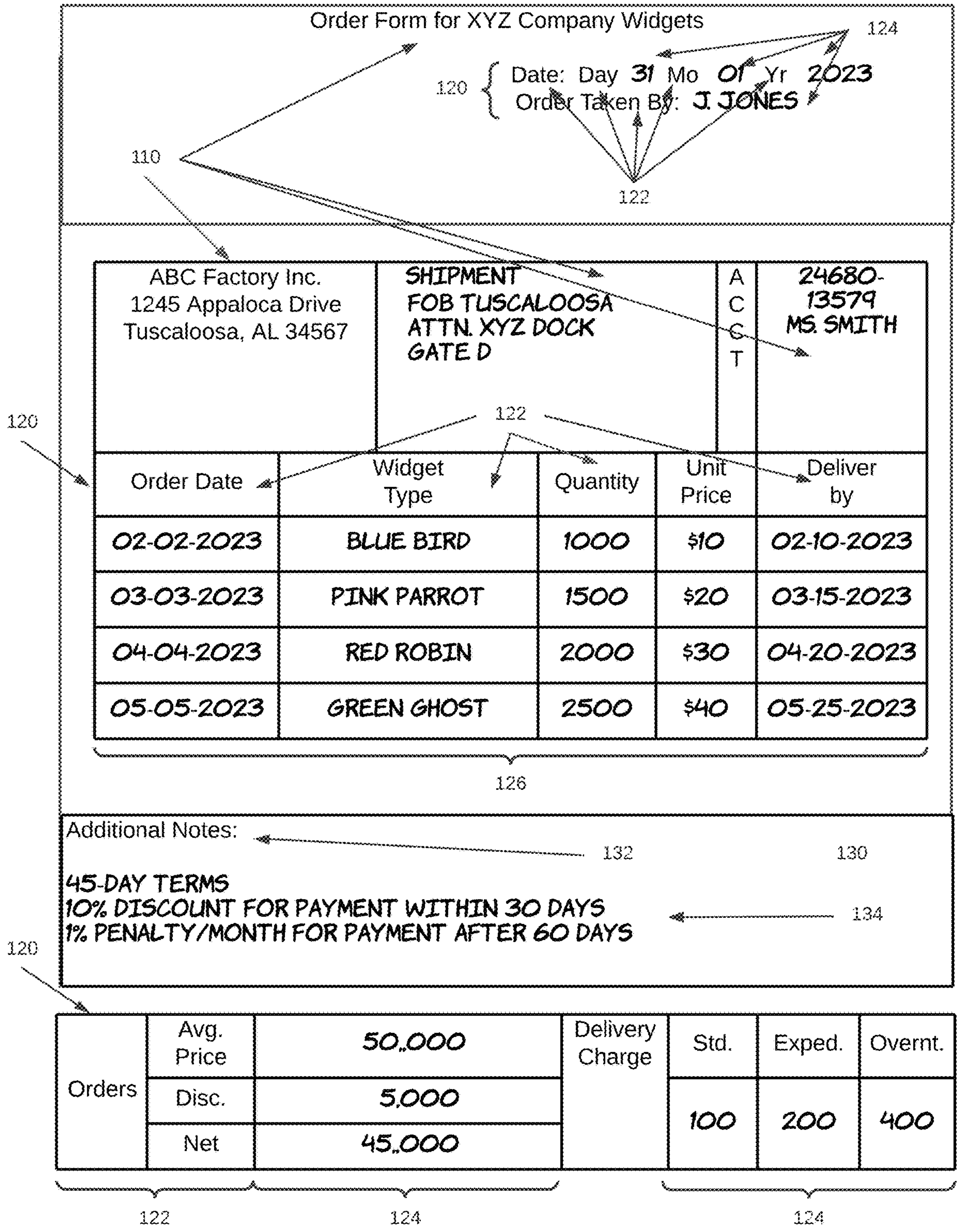
FIG. 3 shows a mock-up of a still different form with a plurality of fields.

In FIG. 3, which is another mockup of a yet different kind of invoice, region 120 near the top of the Figure, containing date and order taker information, has a different format from the date information in FIG. 1. As is the case with FIG. 1, such a mockup may be used in training the machine learning system in accordance with an embodiment. Regions 110 in FIG. 3 are somewhat interspersed throughout the form, unlike FIGS. 1 and 2, in which the regions 110 are similarly placed. Region 130 in FIG. 3 is not at the bottom of the form, but rather is in the vicinity of the middle of the form. Regions 120 are above and below region 130. The upper region 120 contains only a vertical table, with header 122 and data 126, while the lower region 120 contains two horizontal tables. with header 122 and data 124.

As noted earlier, the mockups of FIGS. 1-3 are illustrative of data which may be synthetically-generated training data for a machine learning system in accordance with embodiments. By mixing up topographical locations of different types of semantic data, it is possible to train the machine learning system to recognize a wide variety of forms. Synthetically-generated training data can be advantageous because it can be relatively easy to generate, and does not suffer from the kinds of scanning, scaling, and rotational effects that scanned forms can have. Also as noted earlier, it is possible to insert simulations of blurry or otherwise difficult to read data into synthetically-generated forms as training data.

Figure 4:
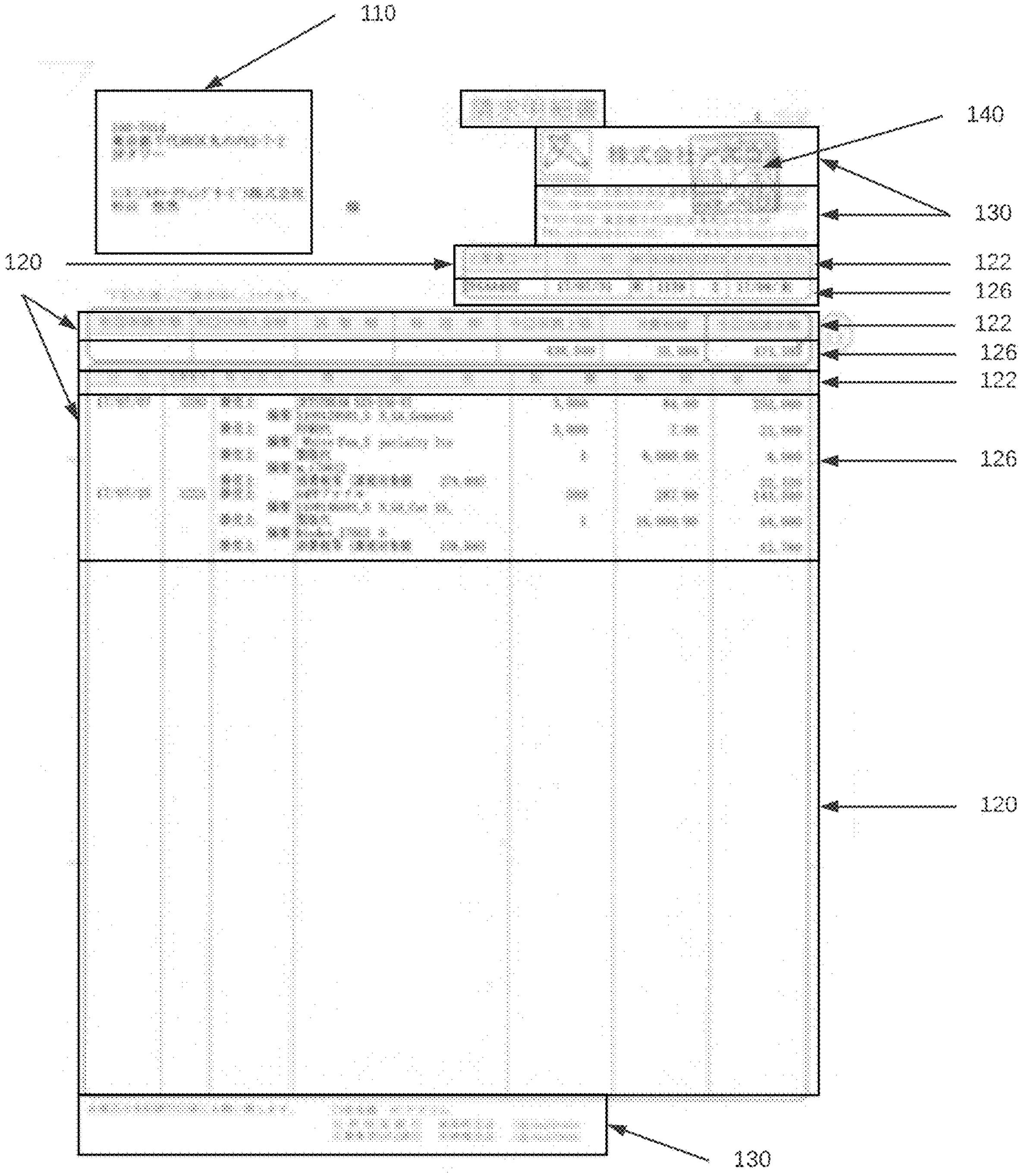
FIG. 4 shows a form with a plurality of fields.
Figure 5:
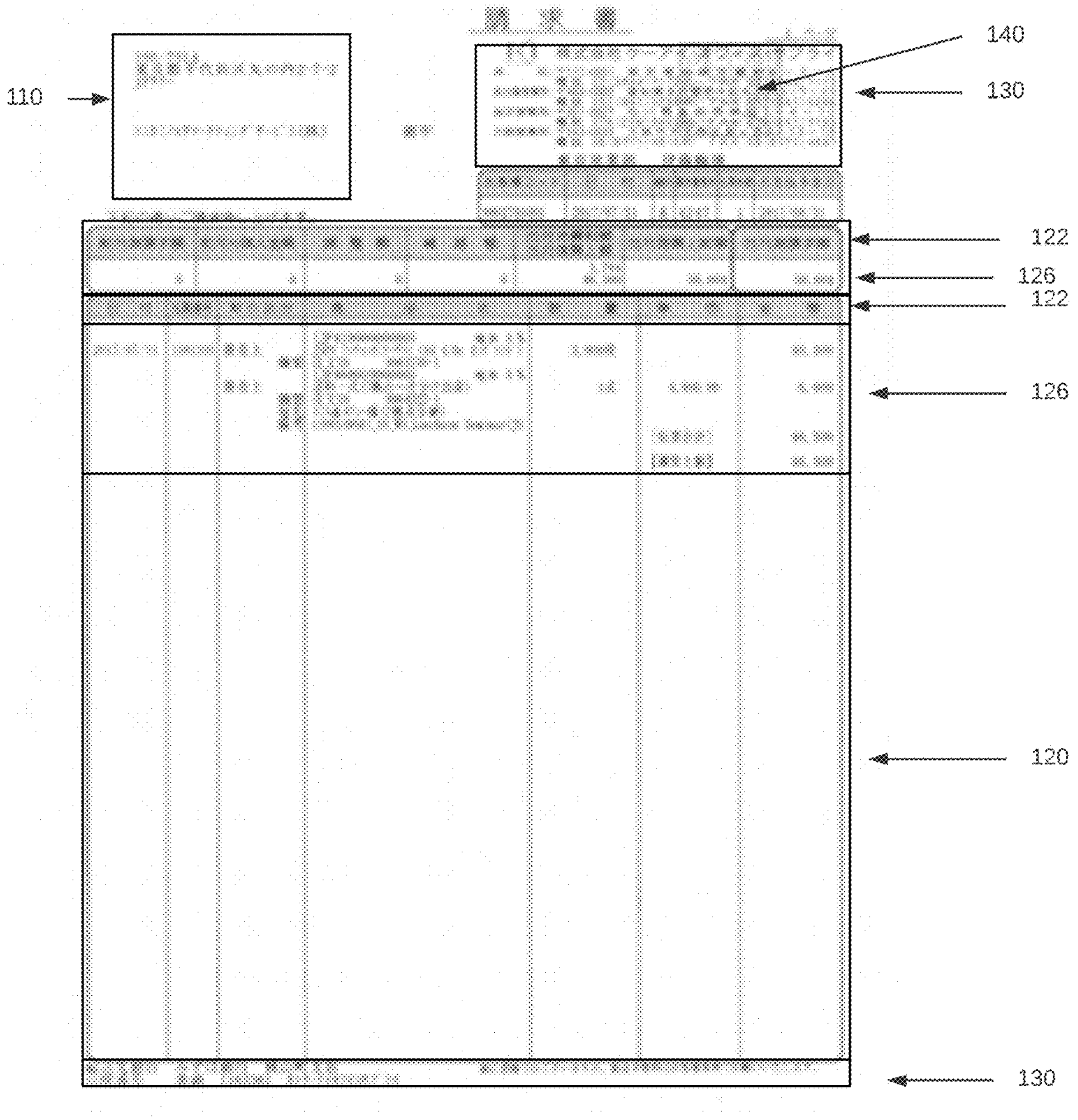
FIG. 5 shows another form with a plurality of fields.
Figure 6:
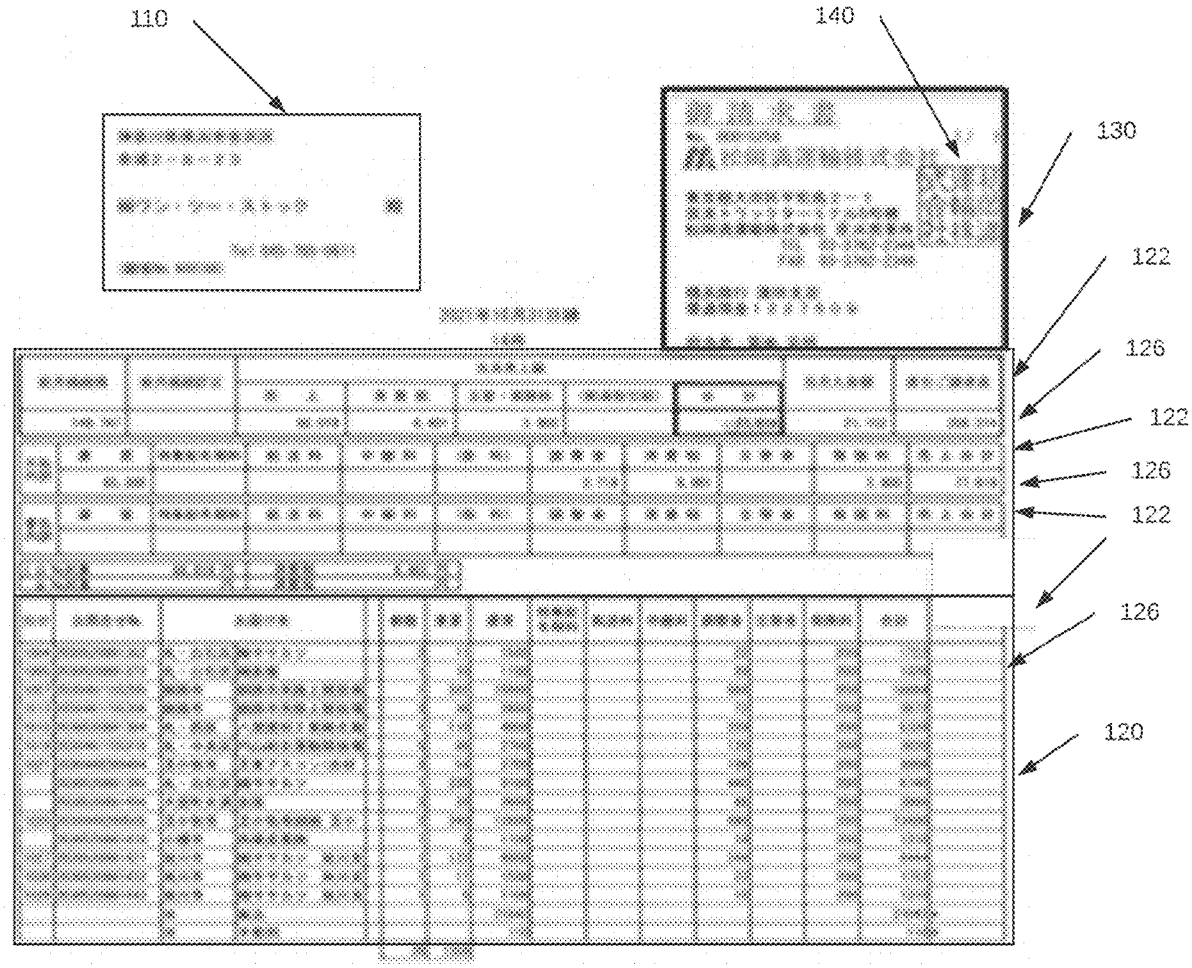
FIG. 6 shows still another form with a plurality of fields.

FIG. 4-6 are examples of forms with regions 110, 120, and 130. There are different numbers of regions 120, in different locations. There also are different regions 130 in different locations. It may be observed that the data in the various tables is not clear. In terms of training the machine learning system, clarity or legibility of data is not as important as identifying topographic and semantic information about the data in the various regions. Having these regions in different quantities and/or different locations in a form can assist in training the machine learning system. Once the machine learning system is trained, it can read forms such as the ones in FIGS. 4-6. Even the presence of stamps 140 in FIGS. 4-6 need not hinder either training or operation of the machine learning system. In each of these Figures, stamp 140 is located in a region, such as region 130. The remaining topographical and semantic information in region 130 can be sufficient for training and operational purposes.

Figure 7A:
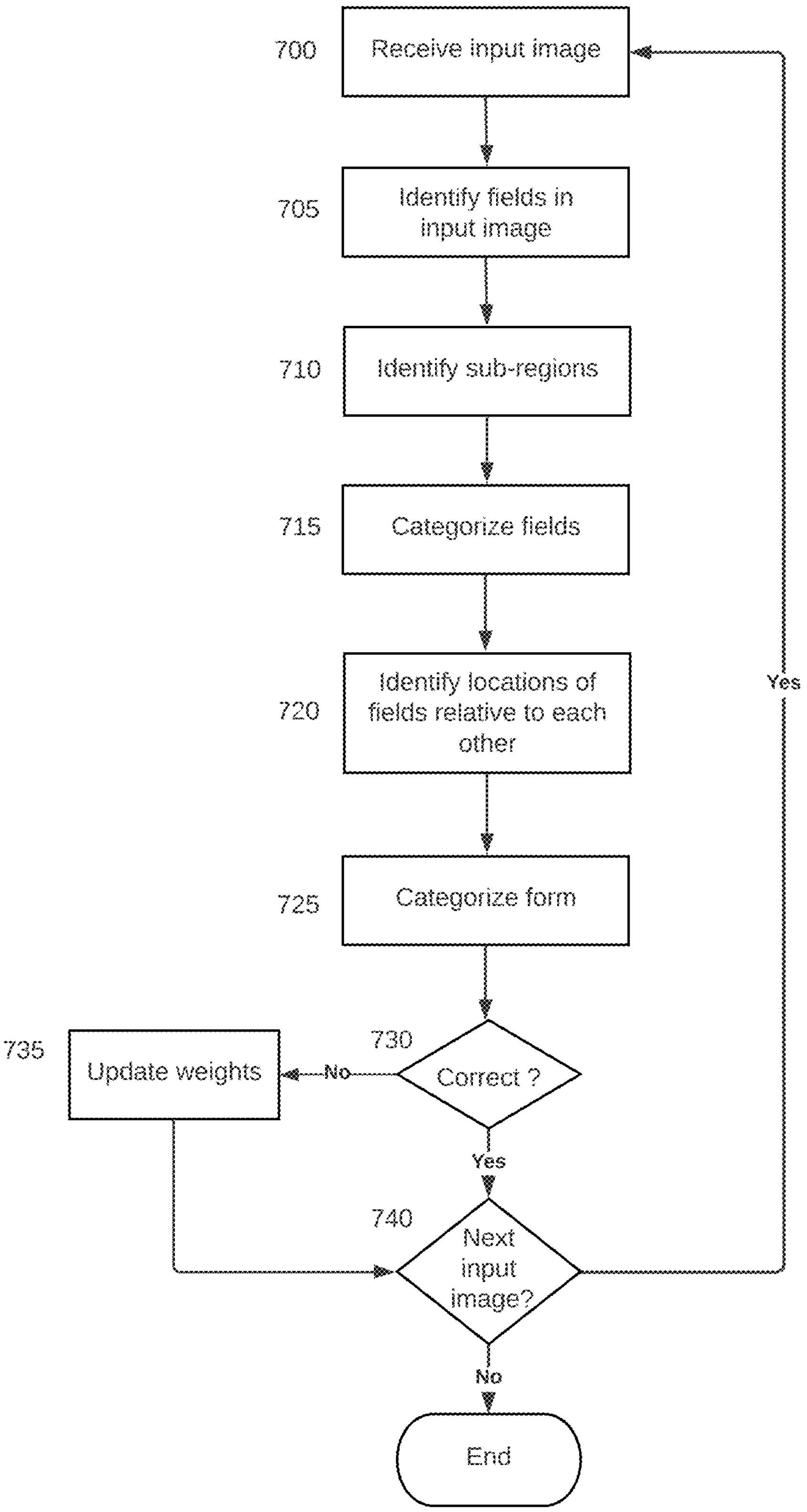
FIG. 7A is a high level flow chart of operations in accordance with an embodiment.

FIG. 7A is a high level flow chart outlining a training operation according to an embodiment. At 700, the system receives an input image. Depending on the embodiment, the image may be a scanned image such as one of FIGS. 4-6, and/or it may be a synthetically generated image, such as one of FIGS. 1-3. At 705, the input image is analyzed to identify the fields in the image. In an embodiment, this field identification process may be iterative, as will be described with respect to FIG. 7B, but this is not essential. At 710, subregions within identified fields may themselves be identified. At 715, the fields are identified categorized, for example, into regions like regions 110, 120, or 130. In an embodiment, fields may be identified and/or categorized by identification of sub-regions within the fields. In an embodiment, the sub-regions may be identified first, with adjacent or abutting sub-regions being combined to constitute an identified field. In such an embodiment, 705 and 710 may be reversed. There may be additional types of regions, depending on the embodiment. Depending on the form or document, different relationships between sub-regions may result in those sub-regions being defined as a field. At 720, locations of fields relative to each other are identified.

At 725, responsive to identification of field location, the input image is identified as a particular form. At 730, a check is made to see whether the form identification is correct. If so, at 740 a check is made to see if there are additional input images for training. If so, the process returns to 700. If not, the process ends.

If the field identification is not correct, at 735 the machine learning system is updated, for example, by updating weights of nodes in a neural network, to address the inaccuracies in field identification. Flow then proceeds to 740, at which a check is made to see if there are additional input images for training. If so, the process returns to 700. If not, the process ends.

In an embodiment, training of the machine learning system may involve definitions of new regions and new fields, and extending the concepts herein to different types of documents that can be identified by defined fields.

Figure 7B:
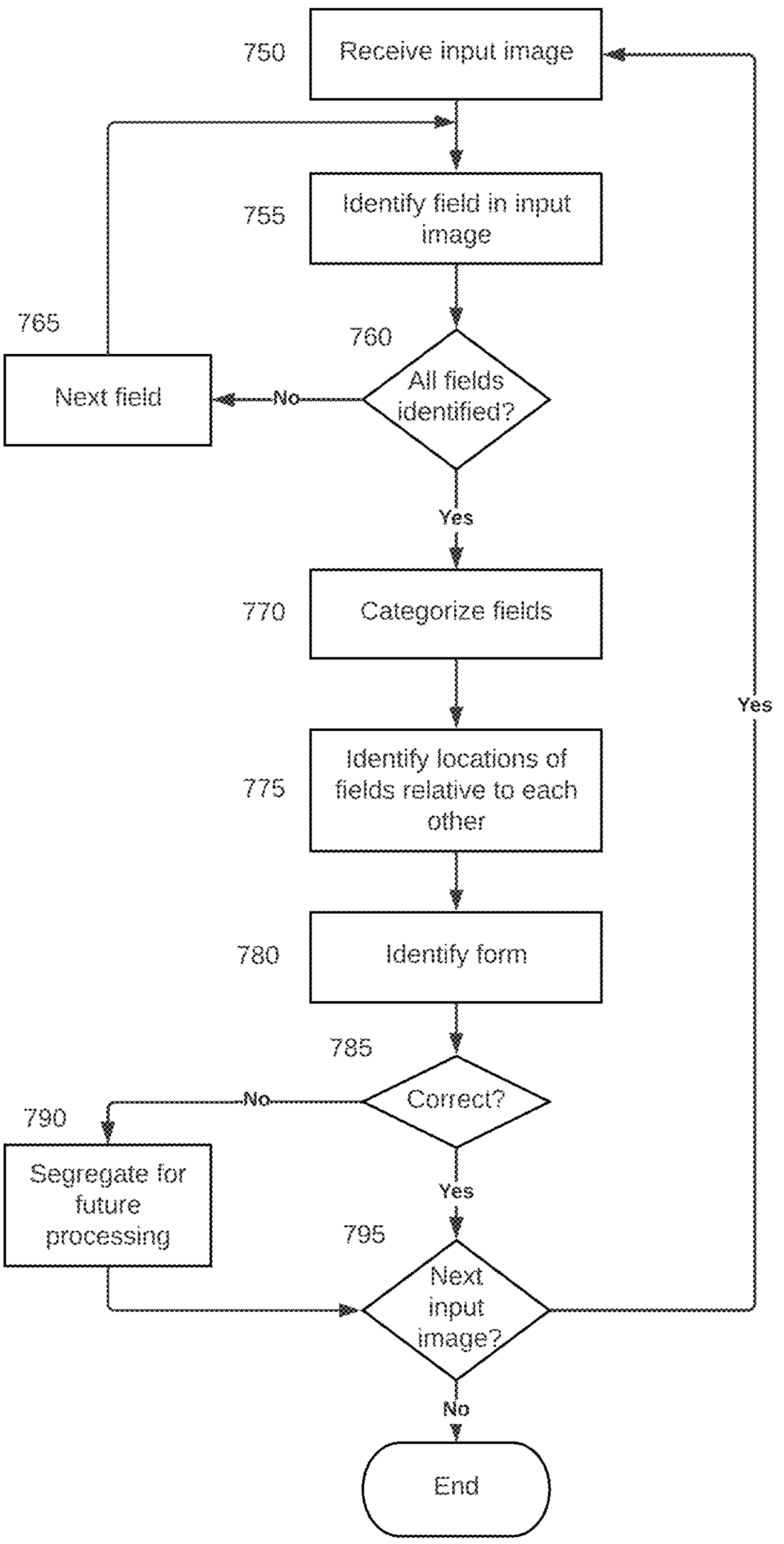
FIG. 7B is a high level flow chart of operations in accordance with an embodiment.

FIG. 7B is a high level flow chart outlining a form identification operation according to an embodiment. At 750, an input image is received. This image will be a form to be identified and, if necessary, registered, or scaled, or translated. At 755, a field is identified in the input image. At 760, a check is made to see whether all fields in the input image have been identified. If they have not, then flow proceeds to 765 and then back to 755 to identify the next field.

If all of the fields have been identified, then at 770, the fields are categorized, for example, into regions like regions 110, 120, or 130. There may be additional types of regions, depending on the embodiment. In an embodiment, subregions may be identified, from which fields may be categorized. Alternatively, fields may be categorized, and subregions in those fields identified. In this respect, flow may proceed similarly to 705-715 in FIG. 7A. At 775, the locations of the identified fields relative to each other are identified. At 780, the form may be identified. In an embodiment, there may be further processing to categorize the form.

At 785, if the identification is correct, at 790 a determination is made whether it is necessary to perform registration on the form. In an embodiment, depending on the quality of the image or the scan, rotation, translation, and/or scaling of the input form may be necessary or appropriate. At 795 a determination is made whether there is a next input image to be processed. If so, flow returns to 750. If not, the process ends.

If the identification is not correct, at 790 the form is segregated for future processing. Such future processing may take numerous forms. By way of non-limiting example, the form may be used in future training. Additionally or alternatively, the form may be processed manually. In an embodiment, depending on the quality of the image or the scan, rotation, translation, and/or scaling of the input form may be necessary or appropriate. At 795 a determination is made whether there is a next input image to be processed. If so, flow returns to 750. If not, the process ends.

FIGS. 7A and 7B show general high level flow for field identification and form characterization according to an embodiment. One approach to this identification and characterization may be found in the establishment of a hierarchical structure in a form, from top to bottom and left to right. In such a process, extracted regions may ranked in a tree-like data structure. Such ranking can facilitate searching and/or relating contents in or between similar documents.

Aspects of the described invention may facilitate floating form registration and free form registration. Embodiments yield a robust system which can compensate for or otherwise accommodate scaling, misregistration, translation, and/or lack of legibility of text and/or data within regions. Embodiments also yield a system which is readily scalable for larger businesses and consistent improvement, In FIG. 8, to train deep learning system 900, computing system 850 may receive scanned forms by scanning documents 810 using scanner 820, via computer 830. Additionally or alternatively, computing system 850 may employ synthetically generated training forms, as ordinarily skilled artisans will appreciate. Computing system 850 may identify fields in the scanned or synthetically generated training forms via field identification section 860.

In an embodiment, storage 875 may store the scanned images or synthetically generated training forms that deep learning system 900 processes. Storage 875 also may store training sets, and/or the processed output of deep learning system 900, which may include identified fields.

Computing system 850 may be in a single location, with network 855 enabling communication among the various elements in computing system 850. Additionally or alternatively, one or more portions of computing system 850 may be remote from other portions, in which case network 855 may signify a cloud system for communication. In an embodiment, even where the various elements are co-located, network 655 may be a cloud-based system.

Additionally or alternatively, processing system 890, which may contain one or more processors, storage systems, and memory systems, may implement regression algorithms or other appropriate processing to resolve locations for fields. In an embodiment, processing system 890 may communicate with deep learning system 900 to assist, for example, with weighting of nodes in the system 900.

Figure 9:
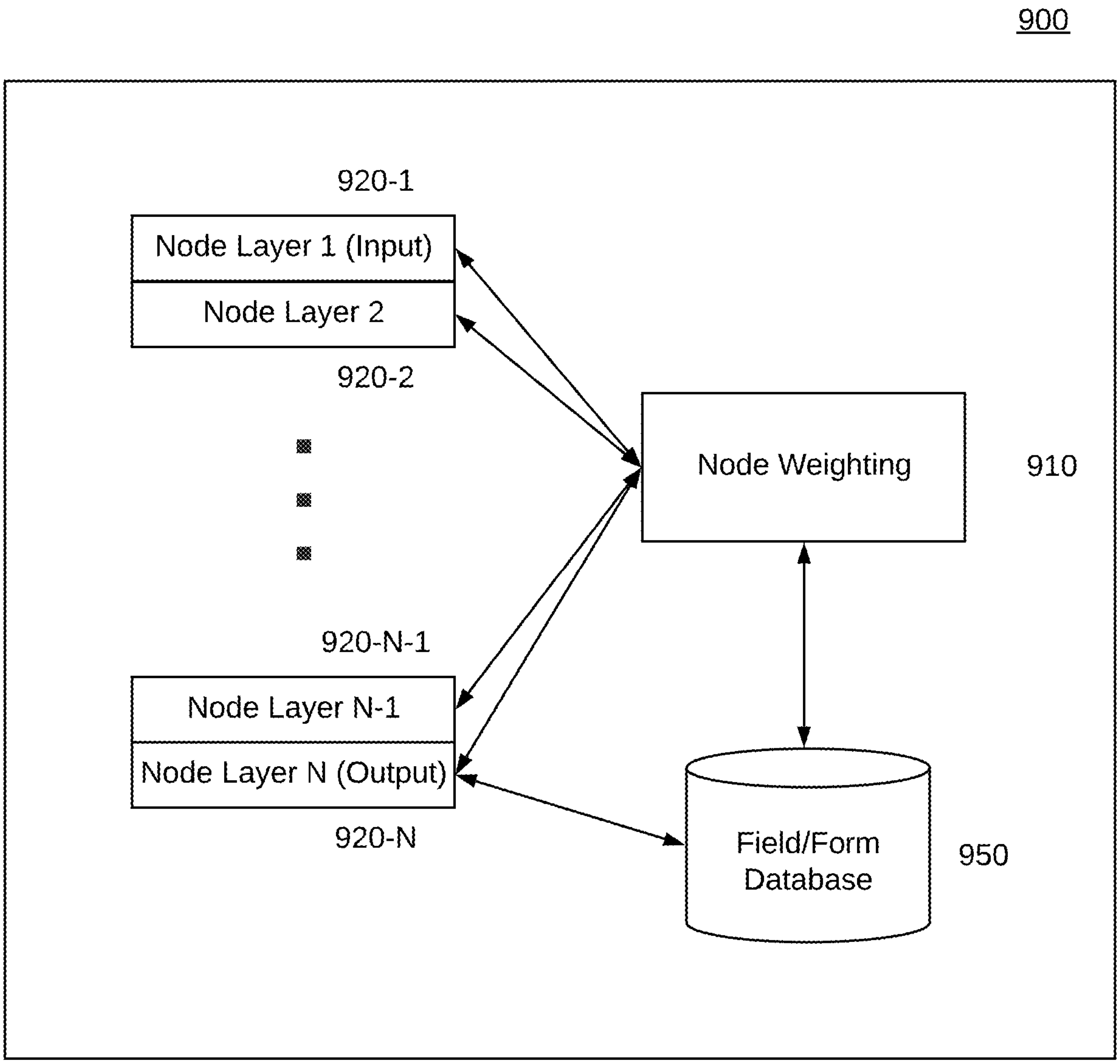
FIG. 9 is a high level block diagram of a deep learning module according to an embodiment.

FIG. 9 shows a slightly more detailed diagram of deep learning system 900. Generally, deep learning system 900 will have processor, storage, and memory structure that ordinarily skilled artisans will recognize. In an embodiment, the processor structure in deep learning system 900 may include graphics processing units (GPU) as well as or instead of central processing units (CPU), as there are instances in which neural networks run better and/or faster and/or more efficiently on one or more GPUs than on one or more CPUs. A neural network, such as a convolutional network (CNN) or a deep convolutional neural network (DCNN), will have a plurality of nodes arranged in layers 920-1 to 920-N as depicted. Layer 920-1 will be an input layer, and layer 920-N will be an output layer. According to different embodiments, N can be two or greater. If N is three or greater, there will be at least one hidden layer (for example, layer 920-2). If N equals two, there will be no hidden layer.

There will be initial weightings provided to the nodes in the neural network. The weightings are adjusted, as ordinarily skilled artisans will appreciate, as modifications are necessary to accommodate the different situations that a training set will present to the system. Node weighting module 910 may store the initial and updated weightings. As the system 900 identifies keywords, the output layer 920-N may provide field and/or form identification to a keyword database 950. The database 950 also may store classifications of forms, with accompanying field locations.

In some embodiments, the functionality of any of the methods, processes, algorithms, or flowcharts described herein may be implemented by software and/or computer program code or portions of code stored in memory or other computer readable or tangible media, and may be executed by a processor.

In some embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components that, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As one non-limiting example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

In an embodiment, an apparatus, such as a controller, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Figure 10:
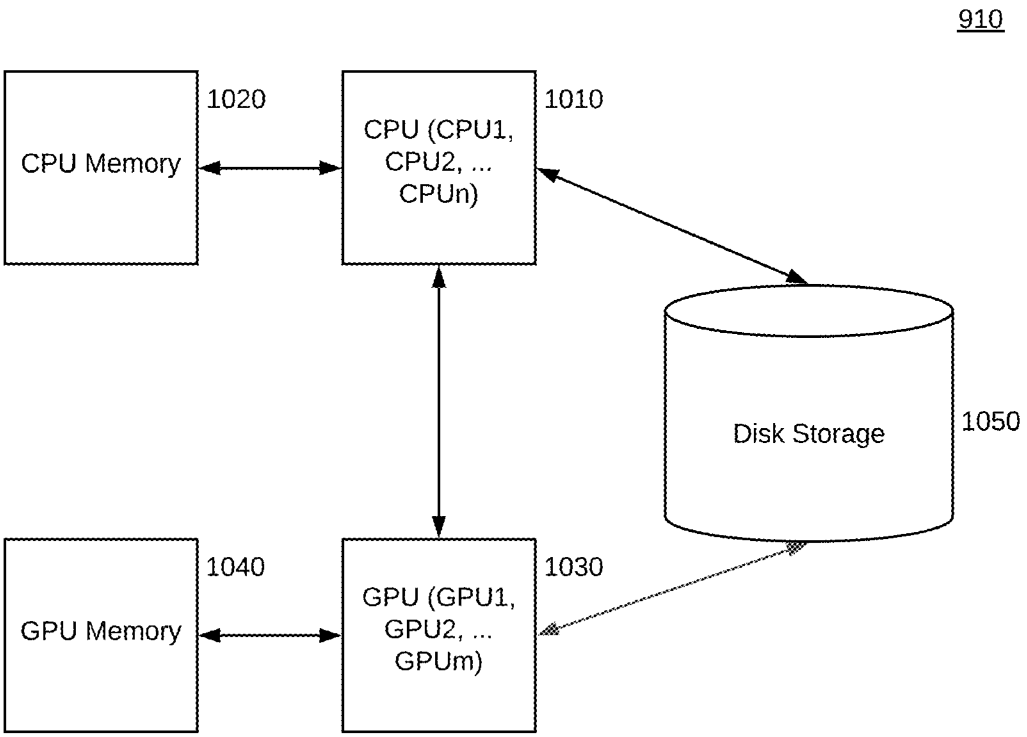
FIG. 10 is a high level block diagram of a node weighting module according to an embodiment.

FIG. 10 is a high level diagram of a computer system that may be used to implement aspects of node weighting module 910. In FIG. 10, one or more central processing units (CPUs) 1010 communicate with CPU memory 1020, which may comprise RAM, and with disk storage 1050. Each of the one or more CPUs 1010 may comprise multiple cores, each with a certain capability and capacity. Depending on the embodiment, each CPU 1010 may have its own associated CPU memory 1020. Alternatively, the CPUs 1010 may share some or all of the CPU memory 1020. In embodiments, CPU memory 1020 may include volatile and/or non-volatile memory, and in some instances, non-transitory storage. Depending on the embodiment, one or more of the CPUs 1010 may communicate with each other over a bus (not shown), to which CPU memory 1020 also may be connected.

The system also may include one or more graphics processing units (GPUs) 1030, each of which also may comprise multiple cores. In embodiments, one or more of the GPUs 1030 may have a larger, even a substantially larger number of cores than any of the CPUs 1010. In FIG. 10, the one or more GPUs 1030 are shown as communicating with GPU memory 1040, which may comprise RAM, or VRAM, or both and with disk storage 1050. Depending on the embodiment, each GPU 1030 may have its own associated GPU memory 1040. Alternatively, the GPUs 1030 may share some or all the GPU memory 1040. Depending on the embodiment, one or more of the GPUs 1030 may communicate with each other either directly or over a bus (not shown), to which GPU memory 1040 also may be connected. In embodiments, GPU memory 1040 may include volatile and/or non-volatile memory, and in some instances, non-transitory storage. Depending on the embodiment, one or more GPUs 1030 may communicate with one or more CPUs 1010 either directly or over a bus (not shown). The GPU's larger number of cores facilitates operation of a machine learning system, as ordinarily skilled artisans will appreciate. In an embodiment, each of the GPU cores may have a lower capability and capacity than that of the CPU cores.

Generally, all of CPU memory 1020, GPU memory 1040, and disk storage 1050 may comprise computer-readable storage media. In embodiments, disk storage 1050 will comprise non-transitory computer-readable storage media. Disk storage 1050 may comprise one or more hard disk drives (HDD), and/or one or more solid state drives (SDD). In embodiments, the RAM and/or VRAM in memory 1020 and/or memory 1040 will be temporary storage, and thus may comprise volatile computer-readable storage media. In embodiments, one or more of the CPUs 1010 and/or GPUs 1030 may include on-board volatile and/or non-volatile computer readable storage.

In an embodiment, asynchronous operation for the CPU and GPU means that, while the GPU is at a certain point in training using a particular set of data, the CPU may be generating one or more future data sets for the GPU to use in training and/or testing.

Depending on the training model and the associated machine learning algorithms, the processing discussed above may be allocated among two or more CPUs, and/or two or more GPUs, depending on the involved algorithms and their associated hardware requirements.

Figure 8:
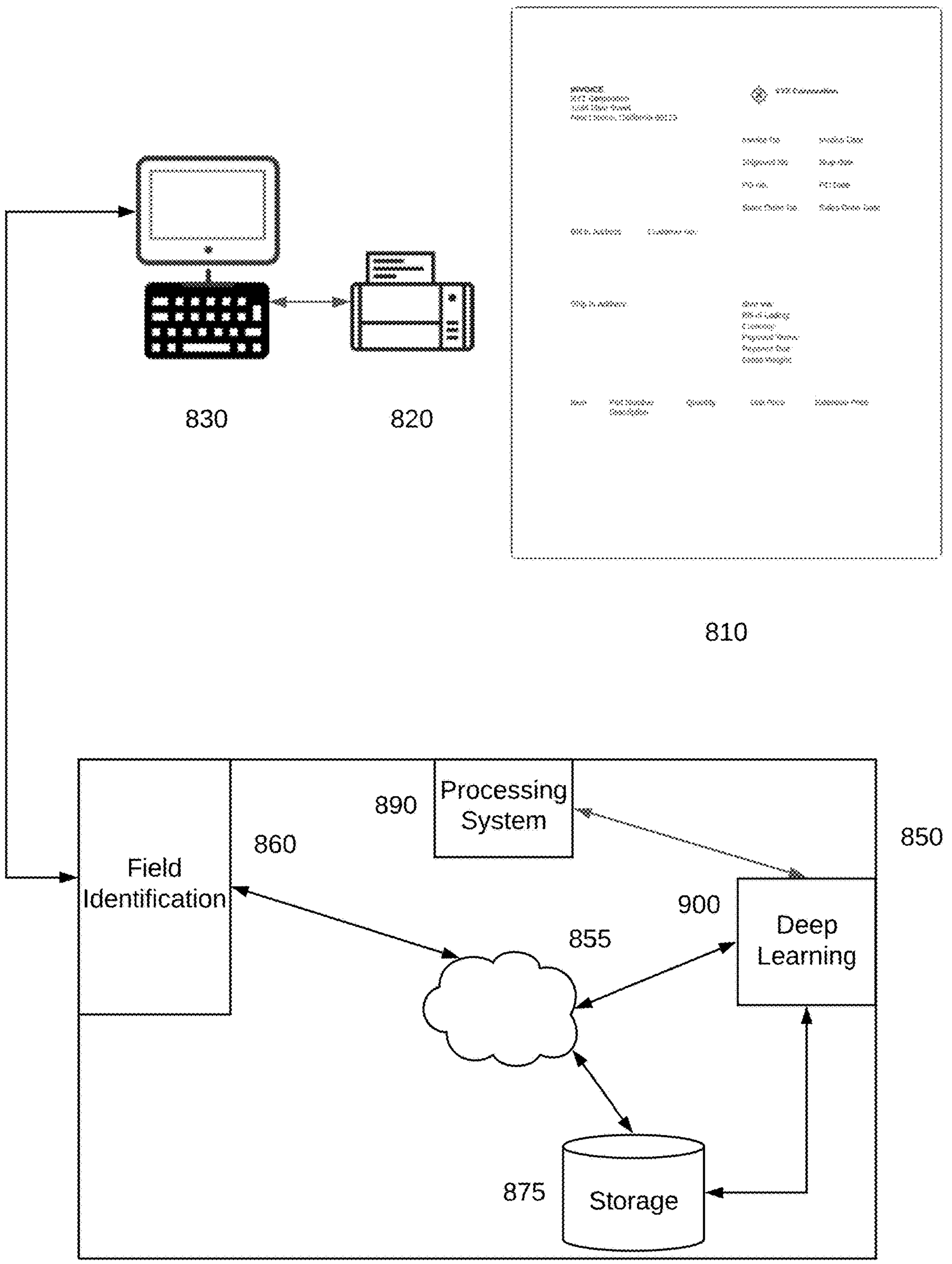
FIG. 8 is a high level block diagram of a system for implementing aspects of the present invention according to an embodiment.

Ordinarily skilled artisans will appreciate that different types of neural networks may be employed as appropriate, and that various functions may be performed by different ones of elements 860, 865, and 890 in FIG. 8, depending on the function to be performed and the resulting efficiency of dividing operations among different processors/GPUs/CPUs in the overall system.

The foregoing discussion has used forms, in particular invoices, as a non-limiting embodiment. Ordinarily skilled artisans will appreciate that the concepts described herein are applicable not only to invoices, but also to other forms, or other documents which have identifiable topographic relationships of fields, semantic information in the fields, and in some instances alignment of text in fields in the documents.

While the foregoing describes embodiments according to aspects of the invention, the invention is not to be considered as limited to those embodiments or aspects. Ordinarily skilled artisans will appreciate variants of the invention within the scope and spirit of the appended claims.

What is claimed is:

1. A computer-implemented method of training a machine learning system to categorize forms in document and form analysis, the method comprising:

a) responsive to receiving a form as an input image, retrieving topological information from the form to identify one or more regions in the input image;

b) in each identified region, identifying one or more fields;

c) in each identified field, discerning a format of one or more sub-regions;

d) responsive to the topological information, the identified one or more regions, the identified one or more fields, and the discerned format of the one or more sub-regions, discerning a format each of the one or more fields;

e) responsive to the discerned format of the one or more fields and of the one or more sub-regions, identifying relative locations of the one or more fields and sub-regions;

f) responsive to the identification of the relative locations, categorizing the form, wherein a) to f) enable form identification for the document and form analysis without determining precise content of textual information;

g) responsive to an incorrect categorization of the form, updating the machine learning system; and h) repeating a) to g) until all forms have been categorized.

2. The computer-implemented method of claim 1, wherein the input images are scanned images, or artificially-generated forms.

3. The computer-implemented method of claim 1, wherein updating the machine learning system comprises updating weights of nodes in the machine learning system.

4. The computer-implemented method of claim 3, further comprising correcting the incorrect categorization.

5. The computer-implemented method of claim 1, further comprising:

c1) identifying boundaries of the one or more sub-regions;

c2) classifying the one or more sub-regions in accordance with its position in the field; and c3) repeating the identifying and classifying until all sub-regions in the field are identified.

6. The computer-implemented method of claim 1, further comprising:

d1) identifying the one or more fields responsive to the identification of the one or more sub-regions, including the positions of the one or more sub-regions relative to each other in the identified field.

7. A computer-implemented method of using a machine learning system to identify forms in document and form analysis, the method comprising:

a) responsive to receiving a form as an input image, retrieving topological information from the form to identify one or more regions in the input image;

b) in each identified region, identifying one or more fields;

c) in each identified field, discerning a format of one or more sub-regions;

d) responsive to the topological information, the identified one or more regions, the identified one or more fields, and the discerned format of the one or more sub-regions, discerning a format each of the one or more fields;

e) responsive to the discerned format of the one or more fields and of the one or more sub-regions, identifying relative locations of the one or more fields and sub-regions;

f) responsive to the identification of the relative locations, categorizing the form, wherein a) to f) enable form identification for the document and form analysis without determining precise content of textual information;

g) responsive to an incorrect categorization of the form, updating the machine learning system; and h) repeating a) to g) until all forms have been categorized.

8. The computer-implemented method of claim 7, further comprising distinguishing some of the one or more fields from others of the one or more fields by identifying different format and/or location.

9. A machine learning system to identify forms in document and form analysis, the machine learning system comprising at least one processor and a non-transitory memory that contains instructions that, when executed, enable the machine learning system to perform a method comprising:

a) responsive to receiving a form as an input image, retrieving topological information from the form to identify one or more regions in the input image;

b) in each identified region, identifying one or more fields;

c) in each identified field, discerning a format of one or more sub-regions;

d) responsive to the topological information, the identified one or more regions, the identified one or more fields, and the discerned format of the one or more sub-regions, discerning a format each of the one or more fields;

e) responsive to the discerned format of the one or more fields and of the one or more sub-regions, identifying relative locations of the one or more fields and sub-regions;

f) responsive to the identification of the relative locations, categorizing the form, wherein a) to f) enable form identification for the document and form analysis without determining precise content of textual information;

g) responsive to an incorrect categorization of the form, updating the machine learning system; and h) repeating a) to g) until all forms have been categorized.

10. The computer-implemented system of claim 9, further comprising distinguishing some of the one or more fields from others of the one or more fields by identifying different format and/or location.

11. The computer-implemented system of claim 9, further comprising, responsive to an incorrect categorization of the form, updating the machine learning system by updating weights of nodes in the machine learning system.

12. The computer-implemented system of claim 11, further comprising correcting the incorrect categorization.

13. The computer-implemented system of claim 9, further comprising:

c1) identifying boundaries of the one or more sub-regions;

c2 classifying the one or more sub-regions in accordance with its position in the field; and c3) repeating the identifying and classifying until all sub-regions in the field are identified.

14. The computer-implemented system of claim 9, further comprising:

d1) identifying the one or more fields responsive to the identification of the one or more sub-regions, including the positions of the one or more sub-regions relative to each other in the identified field.

15. The system of claim 9, the method further comprising:

responsive to categorizing the form, determining whether the form requires one or more of registration, scaling, or translation.

16. The system of claim 15, further comprising, responsive to a determination that the form requires one or more of registration, scaling, or translation, performing one or more of registration, scaling, or translation on the form.

* * * * *